US007971255B1

(12) United States Patent
Kc et al.

(10) Patent No.: US 7,971,255 B1
(45) Date of Patent: Jun. 28, 2011

(54) DETECTING AND PREVENTING MALCODE EXECUTION

(75) Inventors: Gaurav S. Kc, Mountain View, CA (US); Alfred V. Aho, Chatham, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 992 days.

(21) Appl. No.: 11/181,165

(22) Filed: Jul. 14, 2005

Related U.S. Application Data

(60) Provisional application No. 60/588,205, filed on Jul. 15, 2004.

(51) Int. Cl.
*G06F 11/00* (2006.01)
*G06F 12/14* (2006.01)
*G06F 12/16* (2006.01)
*G08B 23/00* (2006.01)

(52) U.S. Cl. ............ 726/24; 713/164; 713/188; 726/25

(58) Field of Classification Search .................. 713/164, 713/188; 726/22, 23, 24, 25
See application file for complete search history.

(56) References Cited

U.S. PATENT DOCUMENTS

| | | | |
|---|---|---|---|
| 6,529,985 B1 * | 3/2003 | Deianov et al. ............... 710/260 |
| 6,618,736 B1 * | 9/2003 | Menage .................... 1/1 |
| 6,732,211 B1 * | 5/2004 | Goyal et al. ................... 710/261 |
| 6,832,302 B1 * | 12/2004 | Fetzer et al. .................. 711/170 |
| 6,868,495 B1 * | 3/2005 | Glover ......................... 713/190 |
| 7,010,698 B2 * | 3/2006 | Sheymov ..................... 713/194 |
| 7,039,718 B2 * | 5/2006 | Vertes ........................... 709/238 |
| 7,039,919 B1 * | 5/2006 | Hunt .............................. 719/316 |
| 7,162,735 B2 * | 1/2007 | Safa ............................... 726/6 |
| 7,191,469 B2 * | 3/2007 | Erlingsson ....................... 726/27 |
| 7,225,428 B1 * | 5/2007 | Fetzer et al. .................. 717/124 |
| 7,228,423 B2 * | 6/2007 | Asai et al. ...................... 713/171 |
| 7,228,563 B2 * | 6/2007 | Szor ............................... 726/22 |
| 7,266,658 B2 * | 9/2007 | Harrington et al. ........... 711/163 |
| 7,287,281 B1 * | 10/2007 | Szor ............................... 726/25 |
| 7,313,824 B1 * | 12/2007 | Bala et al. ....................... 726/27 |
| 7,343,421 B1 * | 3/2008 | Goyal ........................... 709/238 |
| 7,380,039 B2 * | 5/2008 | Miloushev et al. ........... 710/244 |
| 7,392,543 B2 * | 6/2008 | Szor ............................... 726/23 |
| 7,415,712 B2 * | 8/2008 | Hunt ............................. 719/315 |
| 7,434,210 B1 * | 10/2008 | Tucker ........................ 717/138 |
| 7,437,759 B1 * | 10/2008 | Szor ............................... 726/22 |
| 7,493,630 B2 * | 2/2009 | Hunt ............................. 719/330 |
| 7,552,203 B2 * | 6/2009 | Giles et al. .................... 709/223 |
| 7,594,111 B2 * | 9/2009 | Kiriansky et al. ............. 713/166 |

(Continued)

OTHER PUBLICATIONS

Hofmeyr et al., Intrusion Detection using Sequences of System Calls, Aug. 18, 1998, ACM.*

(Continued)

*Primary Examiner* — David Garcia Cervetti
(74) *Attorney, Agent, or Firm* — Byrne Poh LLP

(57) ABSTRACT

A system for detecting and halting execution of malicious code includes a kernel-based system call interposition mechanism and a libc function interception mechanism. The kernel-based system call interposition mechanism detects a system call request from an application, determines a memory region from which the system call request emanates, and halts execution of the code responsible for the call request if the memory region from which the system call request emanates is a data memory region. The libc function interception mechanism maintains an alternative wrapper function for each of the relevant standard libc routines, intercepts a call from an application to one or more libc routines and redirects the call into the corresponding alternative wrapper function.

16 Claims, 3 Drawing Sheets

U.S. PATENT DOCUMENTS

| | | | |
|---|---|---|---|
| 7,603,704 B2* | 10/2009 | Bruening et al. | 726/22 |
| 7,739,401 B2* | 6/2010 | Goyal | 709/238 |
| 7,849,311 B2* | 12/2010 | Donlin et al. | 713/164 |
| 2002/0062389 A1* | 5/2002 | Vertes | 709/238 |
| 2002/0072830 A1* | 6/2002 | Hunt | 701/1 |
| 2002/0116635 A1* | 8/2002 | Sheymov | 713/200 |
| 2003/0005168 A1* | 1/2003 | Leerssen et al. | 709/313 |
| 2003/0074424 A1* | 4/2003 | Giles et al. | 709/219 |
| 2003/0212766 A1* | 11/2003 | Giles et al. | 709/219 |
| 2003/0233385 A1* | 12/2003 | Srinivasa et al. | 709/1 |
| 2004/0064718 A1* | 4/2004 | Harrington et al. | 713/200 |
| 2004/0123122 A1* | 6/2004 | Asai et al. | 713/189 |
| 2004/0153709 A1* | 8/2004 | Burton-Krahn | 714/4 |
| 2004/0158729 A1* | 8/2004 | Szor | 713/200 |
| 2004/0177244 A1* | 9/2004 | Murphy et al. | 713/100 |
| 2004/0177245 A1* | 9/2004 | Murphy | 713/100 |
| 2004/0268361 A1* | 12/2004 | Schaefer | 719/310 |
| 2005/0005101 A1* | 1/2005 | Yenduri | 713/164 |
| 2005/0091310 A1* | 4/2005 | Salomon | 709/203 |
| 2005/0108562 A1* | 5/2005 | Khazan et al. | 713/200 |
| 2005/0273600 A1* | 12/2005 | Seeman | 713/160 |
| 2005/0273858 A1* | 12/2005 | Zadok et al. | 726/24 |
| 2006/0143350 A1* | 6/2006 | Miloushev et al. | 710/242 |
| 2006/0212945 A1* | 9/2006 | Donlin et al. | 726/29 |
| 2007/0055711 A1* | 3/2007 | Polyakov et al. | 707/203 |
| 2007/0204261 A1* | 8/2007 | Fetzer et al. | 717/123 |
| 2008/0155702 A1* | 6/2008 | Bala et al. | 726/27 |
| 2008/0162730 A1* | 7/2008 | Goyal | 709/249 |
| 2009/0049193 A1* | 2/2009 | Goyal | 709/238 |

OTHER PUBLICATIONS

Ko et al., Detecting and Countering System Intrusions Using Software Wrappers, Aug. 2000, USENIX.*

Kc et al., e-NeXSh: Achieving an Effectively Non-Executable Stack and Heap via System-Call Policing, 2005, ACM.*

Acharya, A. et al., "Mapbox: Using Parameterized Behavior Classes to Confine Applications," Proceedings of the 9th USENIX Security Symposium, 1-17, Aug. 2000.

Aleph One, "Smashing the Stack for Fun and Profit," Phrack, 7(49), 1996.

Alexandrov, A. et al., "Consh: A Confined Execution Environment for Internet Computations," Dec. 1998.

Balzer, R. et al., "Mediating Connectors: A Non-Bypassable Process Wrapping Technology," Proceedings of the 19th IEEE International Conference on Distributed Computing Systems, Jun. 1999.

Baratloo, A. et al., "Transparent Run-Time Defense Against Stack Smashing Attacks", Proceedings of the 2000 USENIX Annual Technology Conference, Jun. 2000.

Barrantes, G. et al.,"Randomized Instruction Set Emulation to Disrupt Binary Code Injection Attacks," Proceedings of the ACM Computer and Communications Security (CCS) Conference, Oct. 2003.

Berman, A. et al., "TRON: Process-Specific File Protection for the UNIX Operating System," Proceedings of the USENIX Technical Conference, Jan. 1995.

Bhatkar, S. et al., "Address Obfuscation: An Efficient Approach to Combat a Broad Range of Memory Error Exploits," Proceedings of the 12th USENIX Security Symposium, 105-120, Aug. 2003.

Bulba and KIL3R, "Bypassing StackGuard and Stack-Shield," Phrack, 5(56), May 2000.

Chari, S. et al., "BlueBox: A Policy-Driven, Host-Based Intrusion Detection System," Proceedings of the 9th Network and Distributed System Security Symposium (NDSS), Feb. 2002.

Chen, H. et al., "Model Checking One Million Lines of C Code," Proceedings of the 11th Network and Distributed System Security Symposium (NDSS), 171-185, Feb. 2004.

Chen, H. et al., "MOPS: an Infrastructure for Examining Security Properties of Software," Proceedings of the ACM Computer and Communications Security (CCS) Conference, 235-244, Nov. 2002.

Chew, M. et al., "Mitigating Buffer Overflows by Operating System Randomization," Technical Report Computer Science Technical Report 65, Carnegie Mellon University, Dec. 2002.

Christodorescu, M. et al., "Static Analysis of Executables to Detect Malicious Patterns," Proceedings of the 12th USENIX Security Symposium, Aug. 2003.

Cowan, C, et al., "FormatGuard: Automatic Protection From printf Format String Vulnerabilities," Proceedings of the 10th USENIX Security Symposium, 191-199, Aug. 2001.

Cowan, C, et al., "PointGuard: Protecting Pointers From Buffer Overflow Vulnerabilities," Proceedings of the 12th USENIX Security Symposium, 91-104, Aug. 2003.

Cowan, C, et al., "SubDomain: Parsimonious Security for Server Appliances," Proceedings of the 14th USENIX System Administration Conference (LISA 2000), Mar. 2000.

Cowan, C, et al., "Stackguard: Automatic adaptive detection and prevention of buffer-overflow attacks," Proceedings of the 7th USENIX Security Symposium, Jan. 1998.

Durden, T., "Bypassing PaX ASLR protection," Phrack, 11(59), 2002.

Engler, D. et al.,"RacerX: Effective, Static Detection of Race Conditions and Deadlocks," Proceedings of ACM SOSP, Oct. 2003.

Fayolle, P. et al., "A buffer overflow study: Attacks and defences," Mar. 2002.

Feng, H. H. et al., "Anomaly detection using call stack information," Proceedings of the IEEE Symposium on Security and Privacy, May 2003.

Foster, J. et al., "A theory of type qualifiers," Proceedings of the ACMSIGPLAN Conference on Programming Language Design and Implementation (PLDI), May 1999.

Frantzen, M. et al., "StackGhost: Hardware facilitated stack protection," Proceedings of the USENIX Security Symposium, 55-56, Aug. 2001.

Fraser, T. et al., "Hardening COTS Software with Generic Software Wrappers," Proceedings of the IEEE Symposium on Security and Privacy, May 1999.

Ganapathy, V. et al., "Buffer Overrun Detection using Linear Programming and Static Analysis," Proceedings of the 10th ACM Conference on Computer and Communications Security (CCS), 345-364, Oct. 2003.

Garfinkel, T., "Traps and Pitfalls: Practical Problems in System Call Interposition Based Security Tools," Proceedings of the 10th Network and Distributed System Security Symposium (NDSS), 163-176, Feb. 2003.

Garfinkel, T. et al., "Ostia: A Delegating Architecture for Secure System Call Interposition," Proceedings of the 11th Network and Distributed System Security Symposium (NDSS), 187-201, Feb. 2004.

Garfinkel, T. et al., "A Virtual Machine Introspection Based Architecture for Intrusion Detection," Proceedings of the 10th Network and Distributed System Security Symposium (NDSS), 191-206, Feb. 2003.

Gera, "Advanced in format string exploitation," Phrack, 11(59), 2002.

Ghormley, D.P. et al., "SLIC: An Extensibility System for Commodity Operating Systems," Proceedings of the 1998 USENIX Annual Technical Conference, 39-52, Jun. 1998.

Ghosh, A.K, et al., "Analyzing programs for vulnerability to buffer overrun attacks," Proceedings of the 21st NIST-NCSC National Information Systems Security Conference, 274-382, 1998.

Giffin, J. et al., "Efficient context-sensitive intrusion detection," Proceedings of the 11th Network and Distributed System Security Symposium (NDSS), 2004.

Goldberg, I. et al., "A Secure Environment for Untrusted Helper Applications," Proceedings of the 1996 USENIX Annual Technical Conference, 1996.

Haugh, E. et al., "Testing C Programs for Buffer Overflow Vulnerabilities," Proceedings of the 9th Network and Distributed System Security Symposium (NDSS), Feb. 2002.

Hofmeyr, S. A. et al., "Intrusion detection using sequences of system calls," Journal of Computer Security, 6(3):151-180, 1998.

Jim, T. et al., "Cyclone: A safe dialect of C," Proceedings of the USENIX Annual Technical Conference, 275-288, Jun. 2002.

Johnson, S.C., "Lint, a C program checker," Technical Report Computer Science Technical Report 65, Bell Laboratories, Murray Hill, New Jersey, Dec. 1977.

Jones, R. W. M. et al., "Backwards-compatible bounds checking for arrays and pointers in C program," Third International Workshop on Automated Debugging, 1997.

Kc, G.S. et al., "Countering Code-Injection Attacks With Instruction-Set Randomization," Proceedings of the ACM Computer and Communications Security (CCS) Conference, 272-280, Oct. 2003.

Kiriansky, V. et al., "Secure execution via program shepherding," Proceedings of the 11th USENIX Security Symposium, 191-205, Aug. 2002.

Klog, "The Frame Pointer Overwrite," Phrack, 9(55), 1999.

Larochelle, D. et al., "Statically Detecting Likely Buffer Overflow Vulnerabilities," Proceedings of the 10th USENIX Security Symposium, 177-190, Aug. 2001.

Lee, W. et al., "Learning Patterns from Unix Process Execution Traces for Intrusion Detection," Proceedings of the AAAI97 workshop on AI methods in Fraud and risk management, 1997.

Lhee, K. et al., "Type-Assisted Dynamic Buffer Overflow Detection," Proceedings of the 11th USENIX Security Symposium, 81-90, Aug. 2002.

Loscocco, P. et al., "Integrating Flexible Support for Security Policies into the Linux Operating System," Proceedings of the USENIX Annual Technical Conference, 29-40, Jun. 2001.

Conover, M., "w00w00 n Heap Overflows," http://www.w00w00.org/files/articles/heaptut.txt, Jan. 1999.

Mitchem, T. et al., "Using Kernel Hypervisors to Secure Applications," Proceedings of the Annual Computer Security Applications Conference, Dec. 1997.

Necula, G.C. et al., "CCured: Type-Safe Retrofitting of Legacy Code," Proceedings of the Principles of Programming Language (PoPL), Jan. 2002.

Nergal, "The Advanced Return-Into-Lib(c) Exploits," Phrack, 10(58), 2001.

Peterson, D.S. et al., "A Flexible Containment Mechanism for Executing Untrusted Code," Proceedings of the 11th USENIX Security Symposium, 207-225, Aug. 2002.

Prasad, M. et al., "A Binary Rewriting Defense Against Stack-based Buffer Overflow Attacks," Proceedings of the USENIX Annual Technical Conference, 211-224, Jun. 2003.

Prevelakis, V. et al., "Sandboxing Applications," Proceedings of the USENIX Technical Annual Conference, 119-126, Jun. 2001.

Provos, N., "Improving Host Security with System Call Policies," Proceedings of the 12th USENIX Security Symposium, 257-272, Aug. 2003.

Rabek J. et al., "Detection of Injected, Dynamically Generated and Obfuscated Malicious Code," Proceedings of the Workshop on Rapid Malcode (WORM), 2003.

Rajagopalan, M. et al., "Cassyopia: Compiler Assisted System Optimization," Workshop on Hot Topics in Operating Systems (HotOS-IX), Lihue, Hawaii, May 2003.

Richarte, G., "Four Different Tricks to Bypass StackShield and StackGuard Protection," Jun. 2002.

RIX, "Smashing C++ vptrs," Phrack, 10(56), May 2000.

Ruwase, O. et al., "A Practical Dynamic Buffer Overflow Detector," Proceedings of the 11th Network and Distributed System Security Symposium (NDSS), 159-169, Feb. 2004.

Shankar, U. et al., "Detecting Format String Vulnerabilities with Type Qualifiers," Proceedings of the 10th USENIX Security Symposium, 201-216, Aug. 2001.

Solar Designer, "Getting Around Non-Executable Stack (and fix)," 1997.

Spafford, E. H., "The Internet Worm Program: An Analysis," Technical Report CSD-TR-823, Purdue University, West Lafayette, Indiana, IN 47907-2004, 1988.

Wagner, D. et al., "Intrusion detection via static analysis," Proceedings of the IEEE Symposium on Security and Privacy, 156-169, 2001.

Wagner, D. et al., "A First Step Towards Automated detection of Buffer Overrun Vulnerablilities," Proceedings of the 7th Network and Distributed System Security Symposium (NDSS), 3-17, Feb. 2000.

Walker, K. M. et al., "Confining Root Programs with Domain and Type Enforcement," Proceedings of the USENIX Security Symposium, 21-36, Jul. 1996.

Warrender, C. et al., "Detecting Intrusions Using System Calls: Alternative Data Models," IEEE Symposium on Security and Privacy, 133-145, 1999.

Watson, R. N. M, "TrustedBSD: Adding Trusted Operating System Features to FreeBSD," Proceedings of the USENIX Annual Technical Conference, 15-28, Jun. 2001.

Wespi, A. et al., "Intrusion Detection Using Variable-Length Audit Trail Patterns," Proceedings of the 3rd International Workshop on the Recent Advances in Intrusion Detection, 2000.

Wilander, J. et al., "A Comparison of Publicly Available Tools for Dynamic Intrusion Prevention," Proceedings of the 10th Network and Distributed System Security Symposium (NDSS), 123-130, Feb. 2003.

Xie, Y. et al., "Using Symbolic, Path-Sensitive Analysis to Detect Memory Access Errors," Proceedings of the 9th European Software Engineering Conference and the 11th ACM Symposium on the Foundations of Software Engineering (ESEC/FSE), Sep. 2003.

Yang, J. et al., "MECA: an Extensible, Expressive System and Language for Statically Checking Security Properties," Proceedings of the 10th ACM Conference on Computer and Communications Security (CCS), 321-334, Oct. 2003.

CERT Advisory CA-2001-19, "Code Red Worm Exploiting Buffer Overflow in IIS Indexing Service DLL," http://www.cert.org/advisories/CA-2001-19.html, Jul. 2001.

CERT Advisory CA-2001-26, "Nimda Worm," http://www.cert.org/advisories/CA-2001-26.html, Sep. 2001.

CERT Advisory CA-2001-33, "Multiple Vulnerabilities in WU-FTPD," http://www.cert.org/advisories/CA-2001-33.html, Nov. 2001.

CERT Advisory CA-2002-12, "Format String Vulnerability in ISC DHCPD," http://www.cert.org/advisories/CA-2002-12.html, May 2002.

CERT Advisory CA-2003-25, "Buffer Overflow in Sendmail," http://www.certorg/advisories/CA-2003-25.html, Oct. 2003.

CERT Advisory CA-2003-28, "Buffer Overflow in Windows Workstation Service," http://www.cert.org/advisories/CA-2003-28.html, Nov. 2003.

The OpenBSD Project 3.3 Release, "Write XOR Execute," http://openbsd.org/33.html, May 2003.

* cited by examiner

DETECTING AND PREVENTING MALCODE EXECUTION

CROSS REFERENCE TO RELATED APPLICATIONS

This application claims benefit of the following Patent Application, which is hereby incorporated by reference in its entirety:

U.S. Provisional Patent Application Ser. No. 60/588,205, filed Jul. 15, 2004.

BACKGROUND OF THE INVENTION

The present invention relates to computer systems, and more particularly, to techniques for detecting and preventing malicious code execution within a computer system.

There is no way to completely categorize all forms of attacks on software systems, but the most common attack techniques can be considered as either (1) application-level attacks employed by Internet crackers and worms, and (2) denial-of-service attacks and attacks that exploit 'logic errors" in the software to cause race conditions or otherwise change the execution of the program.

The first category, application level attacks, exploit vulnerabilities in the software, and force the system to run code of the attackers' choice. This form of attack is the focus of the embodiments described herein. The attacks within the second category require different defense methods, which are outside the scope of the embodiments described herein.

Launching a successful attack that exploits security flaws in software with the intent of compromising the running software has typically involved (a) the attacker overriding the flow of control in the program's execution, and redirecting control to malicious code, i.e., code of the attacker's choice, and (b) introducing malicious code into the program memory.

Control Overriding

Application level attacks generally involve buffer overruns or format-string exploits to overwrite crucial locations in the program memory that contain "code pointers." These code pointers include the return-address and the old-frame-pointer values stored in activation records on the program stack, function-pointer variables, and entries in the procedure-linkage (PLT), global-offset (GOT) and virtual function-pointer (VPTR) tables in the heap, .bss (un-initialized static area) and the initialized static data areas. What is special about these code pointers is that the control flow of the program is directly affected by the values stored in these locations, e.g., the return-address value determines what code is executed after a function has completed execution and needs to return control to its caller. Attackers exploiting buffer-overrun and format-string vulnerabilities try to write the address of "malicious code" into these memory locations, with the aim of getting the processor to start fetching and executing instructions from the malicious code at some point.

The chief factor that enables a malicious attacker to exploit software flaws to force a control override in the program execution is the low-level, data-handling power afforded by systems languages like C and C++. Specifically, the lack of bounds checking on pointer arithmetic (array indexing is implemented as pointer operations) for these languages permits write operations to virtually any part of data memory. Consequently, poor programming practices can lead to a failure on the part of application developers to explicitly validate the size and/or format of the input data. This results in buffer overflows, where input data is copied past the end of the memory space reserved for the data copy, and onto adjoining data. Unfortunately, it is not just application code that is likely to suffer from such vulnerabilities—core routines in the C standard library (libc) such as printf, gets, syslog, and strcpy cannot make assumptions about the size of input and/or output data, and hence are implemented to blindly copy data from the memory location depicted by the input parameter until this data is exhausted. Such buffer overflows can cause severe memory corruption and possibly distort the execution of the program. It is not surprising that buffer overflows are perhaps the most widely exploited type of vulnerability, accounting for approximately half the CERT/CC Advisories in recent years (see, www.cert.org/advisories/).

Malicious Code

A large class of successful attacks on software systems involves some form of injection of executable code via data I/O channels. Once the malicious code is resident in the program memory, all the attacker needs to do is to trigger the injected code via one of the mechanisms for overriding the control flow of the program, described in the last section. However, given the advent of defense techniques that are capable of detecting code executing in memory normally reserved for data, attackers have sought to redirect program control not just to injected code, but rather to existing routines such as system and execve in the standard library. Such "return-into-libc" attacks avoid the need to both inject executable content into data areas of the program memory and override the program flow of control. There is, although, more work involved with these attacks since they need to "massage" the input parameters to these routines in order to make the effect of invoking these routines truly malicious.

It should be noted that injected code and certain functions in the standard library are not the only forms of code that can be abused by return-into-libc-style attacks—any program function can serve the attacker's purposes if (a) he has the liberty of specifying its input parameters, and (b) it ultimately invokes some critical library functions or system-call routines. The following illustrates a wrapper function that introduces vulnerabilities in this manner:

1. void execute(char *program) {
2. /• this is my own wrapper to system */
3. system(program);
4. }

Such programmer-created vulnerabilities may not necessarily be the result of bad programming practices, but could possibly be intentionally inserted by a disgruntled employee or other malicious insider who has access to the codebase.

The following techniques make up the majority of attacks on software systems today.

Stacksmashing Attack—In a demonstration of the classic "stacksmashing" attack technique, Aleph One ["Smashing the stack for fun and profit," *Phrack,* 7(49), 1996] provides a detailed walkthrough of how to exploit a stack buffer-overflow vulnerability to inject attack code, and also overwrite the return address of the function to point to the starting address of this injected code. This paper also suggests ways to increase the chances of the stacksmashing attack:

pad the beginning of the injected code with no-op instructions to make the exploit work even when the exact address of the injected code is not known, and approximate the actual position of the return address relative to that of the vulnerable buffer by copying the address of the injected code over a range of locations, hopefully including the return address position The following illustrates a modified version of the original stack-smashing attack described by Aleph One, where malicious code is injected onto a stack buffer, and the buffer is overrun to overwrite the return address of the function, causing an override of the control flow of the program.

```
1  char *shellcode=
2  "\xeb\xif\x5e\x89\x76\x08\x31\xc0"
3  "\x88\x46\x07\x89\x46\x08\x0c\xb0"
4  "\x89\xf3\x8d\x4e\x08\x8d\x56\x0c"
5  "\xcd\x80\x31\xdb\x89\xd8\x40\xcd"
6  "\x80\xe8\xdc\xff\xff\xff\bin\sh"
7
8  int main(void) {
9  char buffer [96];
10
11 int I=0, *p=(int *) buffer;
12 while (i++<32) *p++=(int) buffer;
13 strncpy(buffer, shellcode,
14 strlen(shellcode));
15 return 0;
16 }
```

When the function completes execution and attempts to return control to its caller, the processor will fetch and execute instructions from whatever return address is specified in the corrupted activation frame header. In a successful attack, this value will typically point to the base of the injected code, i.e., the address of the stack buffer. The while-loop in line 12 above writes 32 (4-byte) words into the 96-byte memory block (buffer) pointed by the pointer (p), thus overflowing buffer and causing the beginning address of the attack code to overwrite the return address for the function. The strncpy statement in lines 13 and 14 completes phase two of the stack-smashing technique, injecting the attack code into the buffer. This injected "shell-code" represents a sequence of Pentium x86 machine instructions to invoke a system call to spawn a shell.

A slight variation on this theme involves injection of code into non-stack buffers, e.g., buffers in the heap, .bss (uninitialized static data) or static initialized data sections. In the case of these static data areas, it is easier for the attacker to determine the exact location of the target buffer, and hence the address of the injected code, since the absolute addresses are determined at link time. Yet another variation involves overwriting, at least part of the stored frame-pointer value in the activation record—this forces the attacked function's caller function to trigger the injected code.

Function-pointer overwriting—This form of attack is similar to the stack-smashing technique in that it involves the use of an unsafe operation with unchecked input data. The difference lies in the fact that the buffer overflow overwrites some other data that is capable of altering the control-flow of the process rather than overwriting the return address or the stored frame-pointer value in an activation record. Various forms of such attacks involve overwriting function pointer variables in C structures, in function activation records, or in C++ classes. It is also possible to overwrite entries in the virtual function-pointer table used for implementing polymorphism in C++, or in the global offset table (GOT), to redirect control to malicious injected code.

In these scenarios, it is not the return from a function body that triggers the attack code, but rather an explicit function invocation (via a function pointer or virtual function) that triggers the injected code. These attacks are harder to prevent than the stack-smashing technique, and are often able to circumvent the various stack-based defense mechanisms known in the art.

Format-string exploit—This attack technique is unique in that it does not involve an explicit memory overwrite via any of the unsafe copy operations listed above. Instead, it exploits the '/.n modifier in C's format strings capability, when combined with dynamically generated strings, to overwrite specified locations in memory with arbitrary values. Obviously, this form of attack can be used to circumvent the normal control-flow by overwriting any of the stored return-address in the activation record, function-pointer variables or entries in various function-pointer tables.

Return-into-libc attack—Many attack techniques involve some sort of code-injection to alter the normal control-flow of the application. There are, however, other forms of attacks, known as "return-to-libc" attacks, that leverage existing functionality to cause malice to the system. This form of attack also involves overwriting of code pointers. However, instead of pointing to any injected attack code, these pointers are overwritten to point to the address of libc functions, typically wrapper functions that provide an indirection to system-call functions. This attack mechanism is able to reuse existing code in the attacked system to bypass most injected-code detection mechanisms, and is undoubtedly much more difficult to beat.

SUMMARY OF THE INVENTION

In one aspect, the invention comprises a monitoring system for detecting and halting execution of malicious code, including a kernel-based system call interposition mechanism, and a libc function interception mechanism. The kernel-based system call interposition mechanism detects a system call request from an application, determines a memory region from which the system call request emanates, and halts execution of the code responsible for the call request if the memory region from which the system call request emanates is a data memory region. In one embodiment, the data memory region includes writable sections of memory. In another embodiment, the system call request includes a communication to an operating system kernel to request interaction with one or more resources.

In one embodiment, the kernel-based system call interposition mechanism further sets an indicator signaling presence and execution of malicious code, if the memory region from which the system call request emanates is a data memory region.

In one embodiment, the libc function interception mechanism maintains an alternative wrapper function for each of the relevant standard libc routines, intercepts a call from an application to one or more libc routines and redirects the call into the corresponding alternative wrapper function. A stack walk is performed along a dynamic chain of each alternative wrapper function, so as to validate call site memory addresses and target site memory addresses against start limits and end limits, respectively, for libc routine associated with the alternative wrapper function.

In one embodiment, an innermost caller-callee pair in the dynamic chain is a direct call function. Another embodiment includes a process enabling flag. The kernel-based system call interposition mechanism and the libc function interception mechanism are enabled to detect and halt execution of malicious code only when the process enabling flag is set. In another embodiment, the system reports information about the malicious code upon detection of the malicious code.

In another aspect, the invention comprises a method of detecting and halting execution of malicious code, including interposing system calls by detecting a system call request from an application, determining a memory region from which the system call request emanates, and halting execution of the code responsible for the call request if the memory region from which the system call request emanates is a data memory region. The method further includes intercepting libc functions by maintaining an alternative wrapper function for each of the relevant standard libc routines, intercepting a call from an application to one or more libc routines and redirecting the call into the corresponding alternative wrapper function.

In one embodiment, the method further includes halting execution of the code responsible, if the memory region from which the system call request emanates includes writable sections of memory. In another embodiment, the system call request includes a communication to an operating system kernel to request interaction with one or more resources.

In another embodiment, the method further includes setting an indicator signaling presence and execution of malicious code if the memory region from which the system call request emanates is a data memory region. In yet another embodiment, the method further includes performing a stack walk along a dynamic chain of each alternative wrapper function, so as to validate call site memory addresses and target site memory addresses against start limits and end limits, respectively, for libc routine associated with the alternative wrapper function.

In one embodiment, an innermost caller-callee pair in the dynamic chain is a direct call function.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

The embodiments of a system for and method of detecting and halting malicious code execution described herein are based on principles behind traditional, host-based intrusion-detection systems (IDS). Such monitoring systems typically infer program behavior from audit patterns, i.e., the observed sequence of system calls emitted by the running program. By building models of expected and/or permissible system-call invocations for program execution, an IDS can correlate anomalies in the observed audit patterns to malicious activity in the program. The described embodiments also use the system calls emitted by a program as an indication of its behavior, but these embodiments also use specific information associated with the system-call invocations rather than static models to infer malicious activity.

Figure 1:
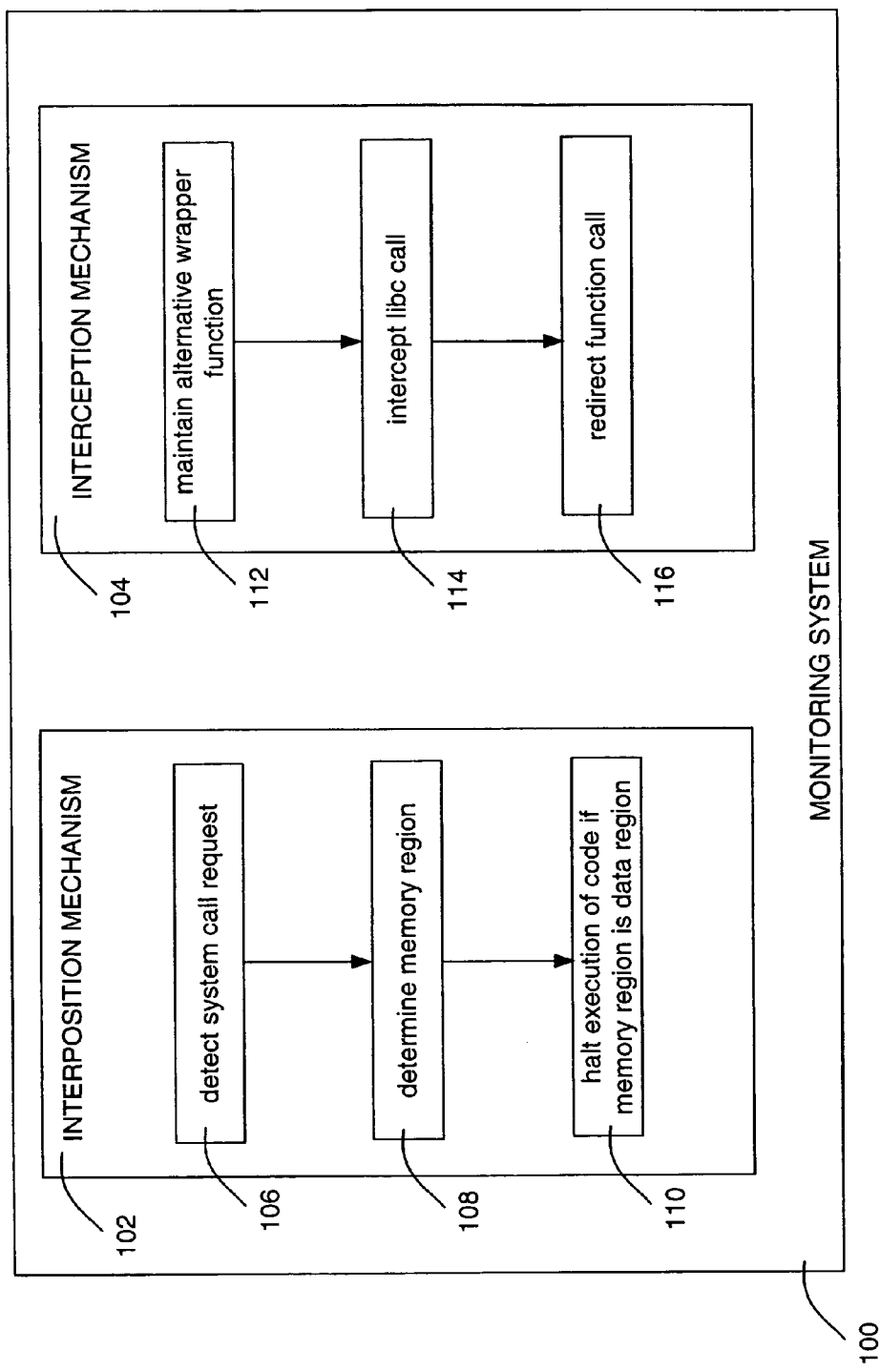
FIG. 1 shows one embodiment of a monitoring system for detecting and halting execution of malicious code.

FIG. 1 shows one embodiment of a monitoring system 100 for detecting and halting execution of malicious code. The monitoring system includes a kernel-based system call interposition mechanism 102 and a libc function interception mechanism 104. These mechanisms work together to detect and halt different types of malicious code.

The kernel-based system call interposition mechanism 102 detects and halts malicious invocations of system calls when issued directly by injected code by detecting a system call request 106 from an application, determines 108 the particular memory region from which the system request emanates, and halts execution 110 of the code responsible for the call request if the particular memory region determined in step 108 is a data memory region.

The libc function interception mechanism 104 detects and halts a return-into-libc attck, which involves redirecting the control of a program into one of the existing libc functions. The libc function interception mechanism 104 generates and maintains 112 an alternative wrapper function, intercepts 114 a call from an application to the libc routines, and redirects 116 the call into the corresponding alternative wrapper function. Using the alternative wrapper function allows the interception mechanism 104 to carry out integrity/identity checks of the intermediate functions leading to the libc function call.

The described embodiments use a kernel-based, system-call interposition technique to utilize this useful vantage point and the "resource manager" role of the operating system kernel to monitor the invocations of system calls. Similar to normal function calling conventions in user code, a system-call invocation also stores information (specifically, the program counter value) about the caller code in the program stack. The system-call handling utility is instrumented in the kernel to perform additional "read-only code" checks to verify that it was "trusted" code in the application program that made the system-call invocation. These terms are explained below.

Trusted, Read-Only Code—Code that exists in executables and shared library files can generally be trusted to be safe and non-malicious, since it is a direct translation product of hand-written code in a higher-level language or assembler. This, of course, excludes program executables that may have been tampered with, or may be infected with a "Trojan horse." This description assumes that all locally available code is trusted and has been kept protected from malicious modifications in a trusted computing base (TCB), and that the execution of this code does not constitute malicious behavior.

The process model of the Linux operating system maps the application and library code from the executable sections in Executable and Linking Format (ELF) files to memory pages that are marked read-only. These pages are write-protected in order to prevent accidental or intentional overwriting of the program code. On the other hand, the data sections are mapped to memory pages marked writable. The delineation of the read-only code memory and the writable data memory for each running process specified in its Process Control Block (PCB) data structure, and hence the range of memory pages (grouped into "virtual memory regions" in Linux) that are write-protected, i.e., that contain the application and library code, can be determined quite easily.

The kernel component of the described embodiments is built into the system call-handler routine in the Linux kernel, where the only verification being carried out originally was whether the specified system call existed on the system. We extended this routine to extract the virtual memory address of the trap instruction (referred to as the system call's "return address") in the application or libc code that triggered the system call handler. To comply with our guidelines for trusted code, this virtual memory address has to exist in a memory region designated for executable code, and marked read-only in the process memory. We first determine what virtual memory region contains the system call's return address, and then verify that this memory region has been marked write-protected. If a system call request is seen to have emanated from a data memory region, i.e., marked writable, we immediately flag that as an attempt by malicious, injected code, and halt the process.

Illegal Invocations of System Calls—Using the definition of trusted code being all those machine instructions executing in the read-only sections of the process memory, one can assume all invocations of system calls by code executing in the writable sections (such as the stack, heap and static data areas) are malicious. Hence, when malicious, injected code used commonly in exploits issues a system call, e.g., execve, the kernel in the described embodiment immediately determines that an attack is in progress, and take reactive steps.

The result is that malicious code, and also legitimate code that requires an executable stack and heap, is allowed to freely execute on the writable data areas as long as it does not invoke a system call. Code that legitimately needs to execute in the stack includes signal return code, trampoline code for nested functions compiled by gcc, longjmp code, and runtime implementations for functional languages like Lisp. However, exploit code will invariably need to invoke a system call to cause any out-of-process damage to the system, and consequently will be caught by the checking mechanism in the kernel.

By making the data areas only partially non-executable, where it is only system-call invocations that are not permitted, the described embodiments manage to avoid the complexities and the overheads of true, prior art non-executable stack and heap techniques. These techniques must go to great lengths to make the stack and heap non-executable, e.g., by intercepting page faults to determine if the currently executing machine instruction is in a page marked writable. Furthermore, a number of these techniques require sophisticated workarounds to emulate an executable stack for code such as gcc function trampolines and signal handler return code.

Given that many attack methods need to invoke system calls as part of their execution, the described embodiments are able to defeat such attacks without having to detect or prevent specific cases of buffer overflows or format-string exploits. Using this broad approach of not worrying about individual buffers and format strings, the described embodiments are leaner and less intrusive, while being more efficient than the similar prior art techniques.

Evading the Kernel Checks—Using the virtual memory address of code that invokes a system call to identify whether it is malicious only works when code that has been injected into the writable data areas makes the system-call invocation directly by issuing a trap instruction like the stacksmashing code example described herein. However, more sophisticated attack methods such as "return-into-libc" attacks automatically pass the "read-only code" checks carried out in the system-call handler in the kernel. Since these attacks invoke the system-call wrapper functions in the standard C library (libc), the actual machine instruction that issues the trap instruction will be part not of any injected code in the data area, but rather will be from libc. Hence that machine instruction will have a virtual memory address that does exist in the read-only part of the process memory. This form of attack is a response to the various defense techniques that render the stack and heap memory areas non-executable.

Defeating Return-Into-Libc Attacks—The described embodiment deflects return-into-libc attacks by requiring the standard library functions to verify the integrity and/or identity of their callers, in an attempt to weed out illegal redirections of program flow of control into libc functions. The described embodiment does so by enforcing an automatic check to validate the intermediate callers in each call-sequence leading to the invocation of a libc function. This checking mechanism, explained next, is the user-mode equivalent of the system-call interception that takes place in the kernel. The described embodiment first runs a disassembler, specifically, a modified objdump binary (from the GNU binutils package), to extract the start and end of each function in the program code—this will be used later to validate callers of functions. New wrapper functions are created for all the relevant standard library routines. These wrapper functions are defined in a special shared library (e.g., e-NeXSh.so) interposed between the application and libc. The LD_PRELOAD environment variable functionality in the Linux operating system is used to automatically intercept all calls to specific libc functions, and redirect control into the new versions of these functions in e-NeXSh.so.

Figure 2:
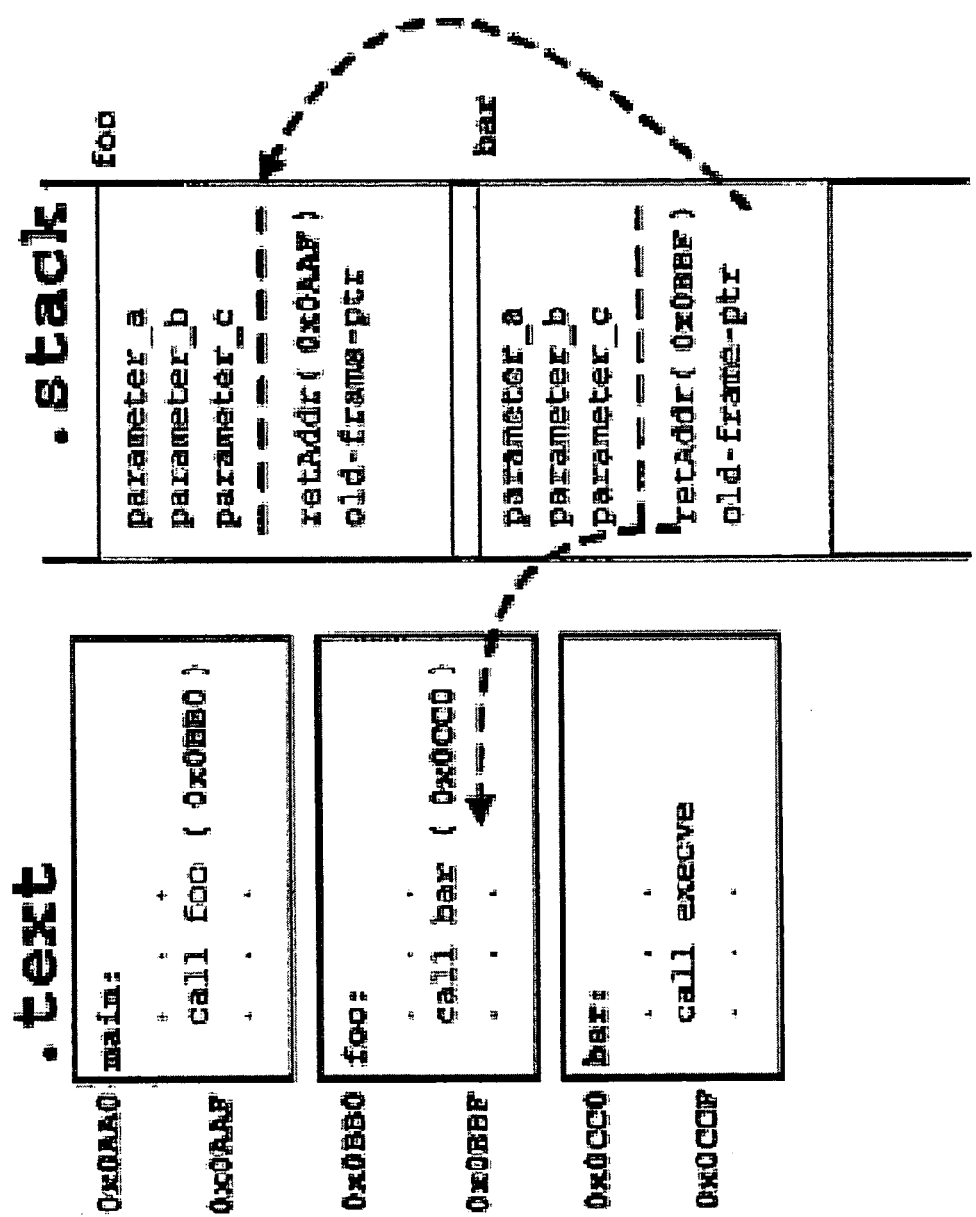
FIG. 2 illustrates the verification of a single caller-callee function relationship.

Use of the new wrapper functions allows the described embodiment to carry out the integrity/identity checks without having to modify either the application source or binary code. In each wrapper function, a stack walk is performed along the "dynamic chain" of intermediate functions starting from main( ) and ending with the function that eventually invoked the libc function. Doing so yields a list of return addresses for each of the intermediate functions. The described embodiment verifies that each of these return addresses exists in the write-protected memory region reserved for the application code, i.e., the .text section. The described embodiment then inspects the .text section of the process memory to extract and decode each call instruction preceding the instructions at these return addresses. The described embodiment then verifies that the absolute target address of this direct call instruction corresponds exactly to the beginning address of the function that is one level deeper on the call chain, i.e., for each caller-callee pair in the dynamic chain, the described embodiment validates the call site and target site memory addresses against the start and end limits for the relevant functions. FIG. 2 illustrates the verification of a single caller-callee function relationship, where "foo" calls "bar." The stack-trace yields the return address of "bar" as 0x0BBF. This memory address is de-referenced (verifying that it is contained within foo), and the preceding call instruction is inspected to extract its operand. This value is 0x0CCO, which is then verified that it matches the starting address of bar. In this manner, given the return address for "foo calls bar", the machine code (from the .text section) is used to verify that the caller-callee relationship is legitimate. These checks are repeated for each return address in the stack-trace until reaching main( ).

The x86 processor architecture defines other (i.e., indirect) call instructions that are of variable length, and do not encode the true target of the call instructions. Instead, they utilize indirect addresses stored in registers or the memory at runtime. This precludes making bullet-proof guarantees about all possible caller-callee relationships, and forces acceptance of any function as a valid target for an indirect call instruction. An attacker could then potentially overwrite a function pointer variable, and cause a redirection of control directly into a libc function. Such attacks are countered by requiring the innermost caller-callee pair in the dynamic chain (where the application program invokes the libc function) to be a direct call instruction—a legitimate invocation of libc functions via function pointers in application code is rare, if not unprecedented. This extra constraint considerably increases the difficulty for an attacker to launch a function pointer-based attack, given that he has to call a completely different intermediary function that would end up calling the desired libc function. While such an attack is possible in theory, the actual risk is minimal in practice, based on an analysis of exploits and vulnerable software.

In the described embodiment, once the wrapper function has concluded that the current invocation of the libc function is legitimate, it will first inform the kernel to "authorize" any future system-call invocations while the current wrapper is in scope. This concludes the libc wrapper checks, and it then resumes the program execution by invoking the original libc function (referenced via explicit dlopen/dlsym calls) in the standard C library. The execution of the original libc function in the standard library may involve the invocation of one or more system calls. Given that system-call authorization is still in effect, the kernel component of described embodiment permits these calls to proceed safely. Eventually, when the original libc function completes, the wrapper function again informs the kernel, this time to remove the system-call authorization, and then returns control to the application code.

On the other hand, a return-into-libc attack will generally transfer control directly into the original libc wrapper function. Consequently, when the libc function issues any system call(s), the kernel component of the described embodiment will correctly reject those calls due to their not having been authorized. In a more sophisticated return-into-libc attack that targets the PLT entries, it is our new libc wrapper that is invoked due to the use of the LD .PRELOAD environment variable. The described embodiment detects this attack attempt even earlier when the wrapper function tries to validate the call stack. In either case, the described embodiment thwarts the return-into-libc attack.

Figure 3:
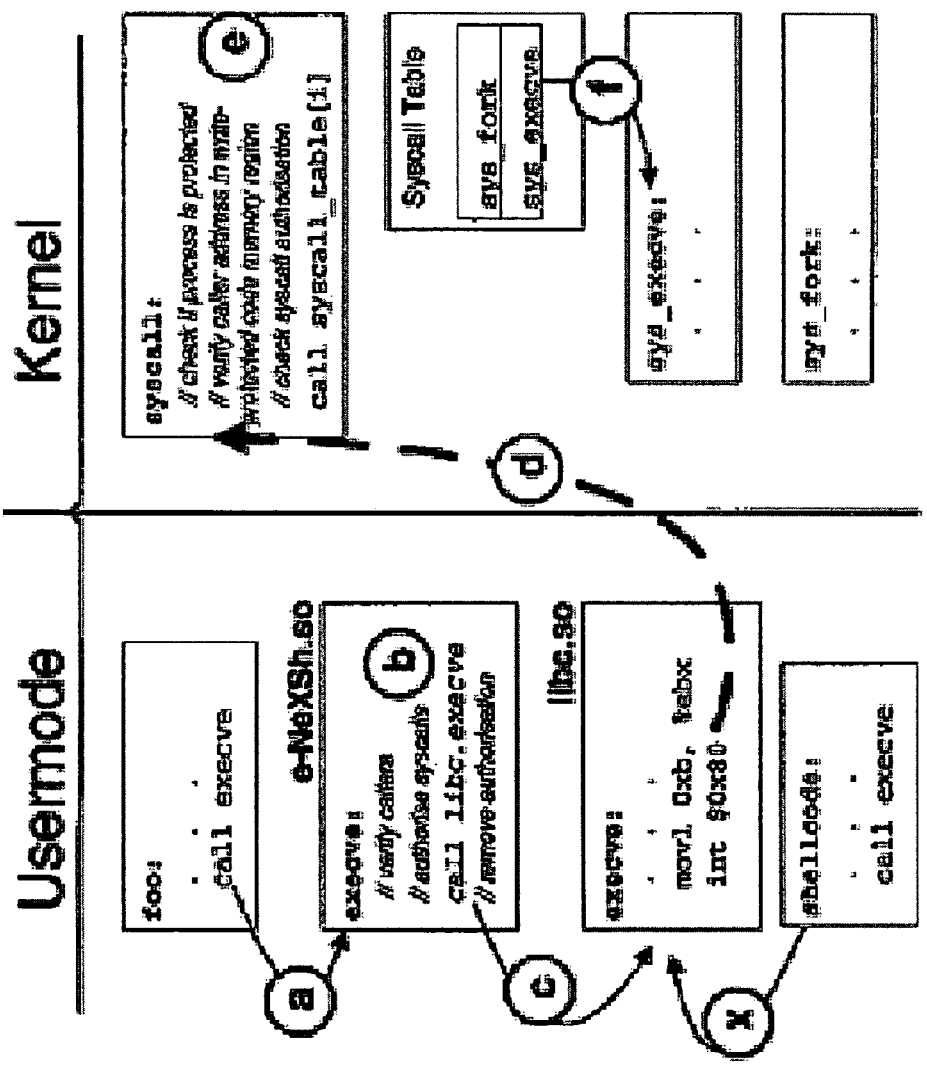
FIG. 3 illustrates a successful, legitimate invocation a system call, and an unsuccessful return-into-libc attempt by malicious code.

FIG. 3 illustrates a successful, legitimate invocation of the sys_execve system call by function "foo" in the application code, as well as an unsuccessful return-into-libc attempt by the malicious code shellcode. The sequence (abcdef) indicates a successful system-call invocation by "valid" function "foo," being routed through the new execve wrapper function in e-NeXSh.so and the original libc wrapper function execve, in order. Step (b) represents the operations of the new wrapper function, starting with the stack-trace and caller-callee verification, and ending with, it informing the kernel to authorize the invocation of sys_execve, before calling the original libc function. Step (d) signifies the execution of the trap instruction, and the triggering of the system-call signal handler in the kernel, and step (e) represents the kernel performing its own checks, including the "read-only code" check to verify that the virtual memory address of the calling code is in read-only memory, and that the currently requested system call is authorized. The sequence (xde) indicates an unsuccessful return-into-libc attempt by attack code in shellcode to invoke the same system call. The attack does pass the "read-only code" check at step (e), but fails the authorisation check in the system call routine because the flow of control did not pass through the authorising call in the new wrapper function Theoretically, an extremely determined attacker could try to inject malicious code that replicates the entire stack for a valid run of the program leading to the invocation of the libc wrapper function. While this is probably impractical to achieve, the task is made significantly more difficult by randomizing the absolute virtual memory locations of the wrapper functions by using an address-obfuscation technique. This technique, similar to the one described in [S. Bhatkar, D. C. DuVarney, and R. Sekar, "Address Obfuscation: an Efficient Approach to Combat a Broad Range of Memory Error Exploits," In Proceedings of the 12th USENIX Security Symposium, pages 105-120, August 2003], displaces the starting location of the wrapper functions by a random offset during process loading, vastly increasing the amount of work required to obtain their absolute addresses Transparency of Use—Even though the techniques used in the described embodiment involves modifications to the kernel, these embodiments minimize interference to the system. For example, these embodiments extend the kernel's Process Control Block (PCB) data structure that maintains runtime information about all existing processes. Further, these embodiments add a flag to determine whether the process should be subject to the e-NeXSh protection. If a process does not have this flag set, its system calls are not checked to see if they are made from write-protected memory pages. These embodiments also extend the system call function responsible for process loading, viz., do_execve to set this flag for the current process based on whether any of the following requirements were met:

the program has the environment variable ENX_PROTECT set with the value YES, e.g., run the program as: bash % ENX_PROTECT=YES ./a.out the program's name contains the suffix—enx-protect, or the program image contains an ELF section titled enexsh—a new section can trivially be added to an existing ELF file using the objcopy utility that is part of the GNU binutils package.

Having the option to selectively protect applications allows one to take any program that does not need the protection and run it unmodified, completely unaffected by the system-call interposition mechanism. For example, not all programs that run on a system are subject to external attacks—the focus of the described embodiment is on server software that does need protecting, such as httpd, sendmail, smbd, imapd, and database servers that actually have to interact with possibly malicious clients on the Internet.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A monitoring system for detecting and halting execution of malicious code, the system comprising:
 a processor that includes a kernel-based system call interposition mechanism and a standard library function interception mechanism, wherein the processor:
  creates an alternative wrapper function that corresponds to one of a plurality of library functions in program code of an application, wherein the alternative wrapper function is interposed between the application and the plurality of library functions;
  uses the alternative wrapper function to intercept a system call request from the application to a library function, verify whether return addresses associated with one or more intermediate functions associated with the system call request are located in write protected memory regions and verify a preceding instruction in the write protected memory region, and transmit a verification indication to an operating system kernel executing the system call request; and
  uses the operating system kernel to execute the system call request based at least in part on the verification indication.

2. The monitoring system of claim 1, wherein the system call request includes a communication to the operating system kernel to request interaction with one or more resources.

3. The monitoring system of claim 1, wherein the processor is further configured to use the kernel-based system call interposition mechanism to set an indicator signaling presence and execution of malicious code if a memory region from which the system call request emanates is a data memory region.

4. The monitoring system of claim 1, wherein the processor is further configured to use the standard library function interception mechanism to (i) maintain the alternative wrapper function for each of the relevant standard C standard library routines, (ii) intercept a call from an application to one or more C standard library routines, and (iii) redirect the call into the corresponding alternative wrapper function.

5. The monitoring system of claim 4, wherein a stack walk is performed along a dynamic chain of each alternative wrapper function, so as to validate call site memory addresses and target site memory addresses against start limits and end limits, respectively, for C standard library routine associated with the alternative wrapper function.

6. The monitoring system of claim 5, wherein an innermost caller-callee pair in the dynamic chain is a direct call function.

7. The monitoring system of claim 1, further including a process enabling flag, wherein the kernel-based system call interposition mechanism and the standard library function interception mechanism are enabled to detect and halt execution of malicious code only when the process enabling flag is set.

8. The monitoring system of claim 1, wherein the system reports information about the malicious code upon detection of the malicious code.

9. A method, implemented on a processor, of detecting and halting execution of malicious code, the method comprising:
receiving system call invocations and invocations of C standard library functions at the processor;
creating an alternative wrapper function that corresponds to one of a plurality of library functions in program code of an application, wherein the alternative wrapper function is interposed between the application and the plurality of library functions;
using the alternative wrapper function to intercept a system call request from the application to a library function, verify whether return addresses associated with one or more intermediate functions associated with the system call request are located in write protected memory regions and verify a preceding instruction in the write protected memory region, and transmit a verification indication to an operating system kernel executing the system call request; and
using the operating system kernel to execute the system call request based at least in part on the verification indication.

10. The method of claim 9, further including halting execution of the code responsible if a memory region from which the system call request emanates includes writable sections of memory.

11. The method of claim 9, wherein the system call request includes a communication to the operating system kernel to request interaction with one or more resources.

12. The method of claim 9, further including setting an indicator signaling presence and execution of malicious code if a memory region from which the system call request emanates is a data memory region.

13. The method of claim 9, further including performing a stack walk along a dynamic chain of each alternative wrapper function, so as to validate call site memory addresses and target site memory addresses against start limits and end limits, respectively, for C standard library routine associated with the alternative wrapper function.

14. The method of claim 13, wherein an innermost caller-callee pair in the dynamic chain is a direct call function.

15. The method of claim 9, further including a process enabling flag, wherein the kernel-based system call interposition mechanism and the standard library function interception mechanism are enabled to detect and halt execution of malicious code only when the process enabling flag is set.

16. The method of claim 9, further including reporting information about the malicious code upon detection of the malicious code.

* * * * *